United States Patent
Fukumura

(10) Patent No.: US 10,824,377 B2
(45) Date of Patent: Nov. 3, 2020

(54) INFORMATION PROCESSING SYSTEM, INFORMATION PROCESSING APPARATUS AND COMPUTER READABLE MEDIUM STORING PROGRAM

(71) Applicant: FUJI XEROX CO., LTD., Tokyo (JP)

(72) Inventor: Kenji Fukumura, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 16/532,878

(22) Filed: Aug. 6, 2019

(65) Prior Publication Data

US 2020/0293242 A1 Sep. 17, 2020

(30) Foreign Application Priority Data

Mar. 13, 2019 (JP) ................. 2019-045942

(51) Int. Cl.
   *G06K 15/00* (2006.01)
   *G06F 3/12* (2006.01)
   *H04N 1/00* (2006.01)

(52) U.S. Cl.
   CPC .......... *G06F 3/1219* (2013.01); *G06F 3/1239* (2013.01); *H04N 1/00408* (2013.01)

(58) Field of Classification Search
   CPC .... G06F 3/1219; G06F 3/1239; G06F 3/1235; H04N 1/00408; G03G 15/553
   See application file for complete search history.

(56) References Cited

U.S. PATENT DOCUMENTS

| 2007/0122164 A1* | 5/2007 | Shiori | G03G 21/1875 |
| | | | 399/8 |
| 2009/0292627 A1* | 11/2009 | Kodimer | G03G 15/5079 |
| | | | 705/29 |
| 2012/0148267 A1* | 6/2012 | Kawai | G03G 15/5079 |
| | | | 399/8 |
| 2016/0328781 A1* | 11/2016 | Patel-Zellinger | ........................... |
| | | | G06Q 30/0635 |
| 2018/0165751 A1* | 6/2018 | Chiyo | G06F 3/1235 |

FOREIGN PATENT DOCUMENTS

| JP | 2015-175307 | 10/2015 |
| JP | 2017-170796 | 9/2017 |

OTHER PUBLICATIONS

English language abstract and machine translation of JP2017-170796.
English language abstract and machine translation of JP2015-175307.

* cited by examiner

*Primary Examiner* — Moustapha Diaby
(74) *Attorney, Agent, or Firm* — Fildes & Outland, P.C.

(57) ABSTRACT

An information processing system includes: a delivery unit that delivers consumable items to plural machines; a determination unit that determines a specific organization, which is capable of offering a specific consumable item, from plural organizations in accordance with inventory information when the delivery unit is suspended, the inventory information indicating an inventory of the consumable items stored in each of the organizations having a certain scale and serving as a unit managing the plural machines; and a display control unit that makes control to display the determined specific organization as a place where the specific consumable item is stored.

20 Claims, 14 Drawing Sheets

FIG. 4

| COMMODITY SERIES | BLACK TONER | CYAN TONER | MAGENTA TONER | YELLOW TONER | TONER RECOVERY BOTTLE |
|---|---|---|---|---|---|
| COMMODITY 1 | 0 | 5 | 0 | 8 | 6 |
| COMMODITY 2 | 5 | 9 | 12 | 18 | 4 |
| COMMODITY 3 | 8 | 4 | 8 | 12 | 10 |
| COMMODITY 4 | 5 | 6 | 9 | 13 | 8 |
| COMMODITY 5 | 10 | 15 | 13 | 9 | 7 |

| CONSUMABLE ITEM ID | BUSINESS OFFICE CODE | BUSINESS OFFICE NAME | ADDRESS | NAME OF CE IN CHARGE |
|---|---|---|---|---|
| 112234 | 9999991 | COMPANY A | KOHOKU-KU 1-1 | ●▼ ×■ |
| 235645 | 9999993 | COMPANY C | KOHOKU-KU 1-2 | ●▼ ×■ |
| 214252 | 9999992 | COMPANY B | KOHOKU-KU 1-3 | ●▼ ×■ |
| 252667 | 9999991 | COMPANY A | KOHOKU-KU 1-1 | ●▼ ×■ |
| 432211 | 9999994 | COMPANY D | KOHOKU-KU 1-4 | ●▼ ×■ |
| 546532 | 9999992 | COMPANY B | KOHOKU-KU 1-3 | ●▼ ×■ |
| 252412 | 9999991 | COMPANY A | KOHOKU-KU 1-1 | ●▼ ×■ |
| 766252 | 9999995 | COMPANY E | KOHOKU-KU 1-5 | ●▼ ×■ |

| MACHINE ID | COMMODITY SERIES | BUSINESS OFFICE CODE | BUSINESS OFFICE NAME | FLOOR | REQUIRED CONSUMABLE ITEM | PRIORITY |
|---|---|---|---|---|---|---|
| xxx | COMMODITY 5 | 9999991 | COMPANY A | 1F | BLACK TONER | 1 |
| yyy | COMMODITY 6 | 9999994 | COMPANY D | 3F | CYAN TONER | 2 |
| zzz | COMMODITY 3 | 9999992 | COMPANY B | 5F | MAGENTA TONER | 3 |
| www | COMMODITY 1 | 9999991 | COMPANY A | 2F | YELLOW TONER | 4 |
| sss | COMMODITY 2 | 9999994 | COMPANY D | 5F | BLACK TONER | 5 |
| ttt | COMMODITY 4 | 9999992 | COMPANY B | 2F | TONER RECOVERY BOTTLE | 6 |

FIG. 7
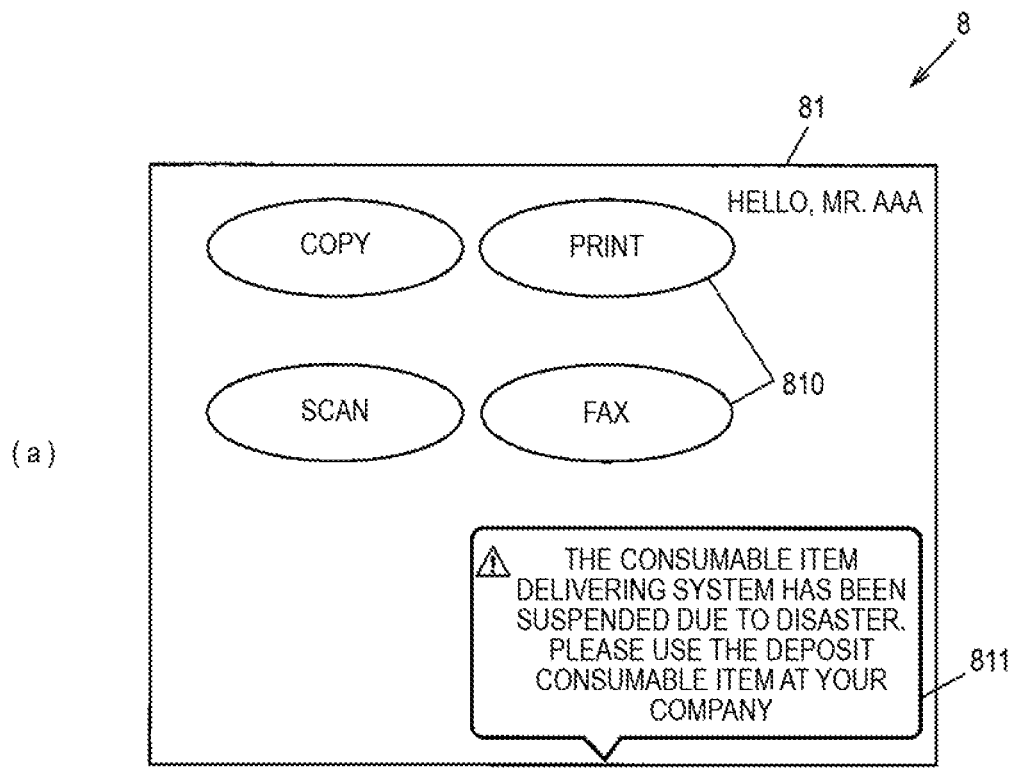
(a)
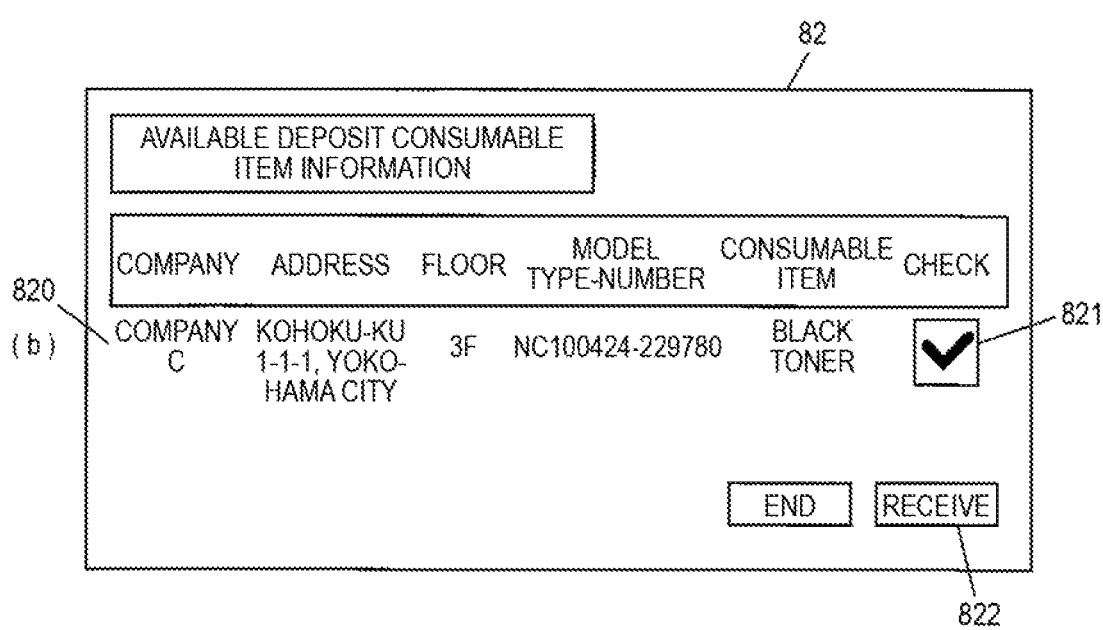
(b)

FIG. 8
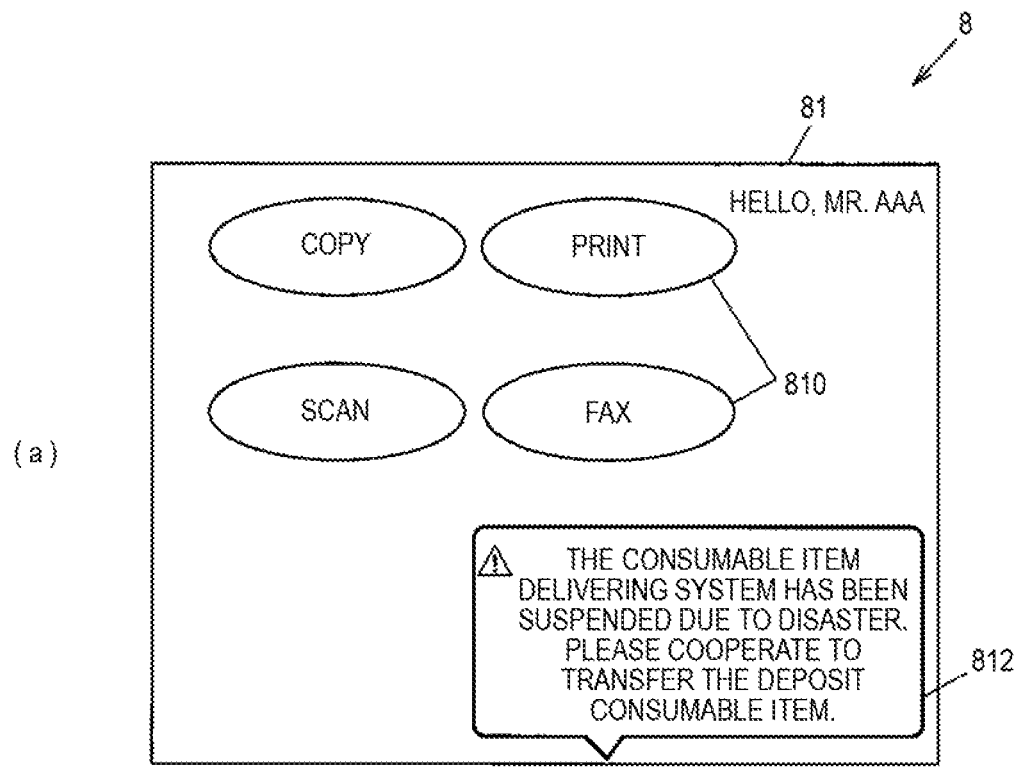
(a)
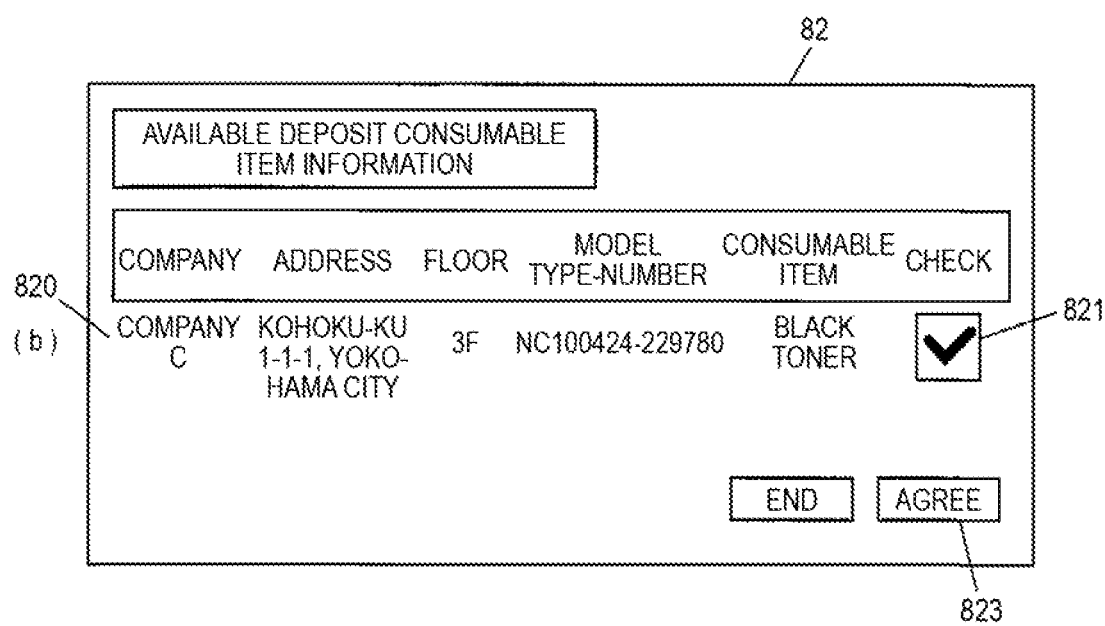
(b)

FIG. 9
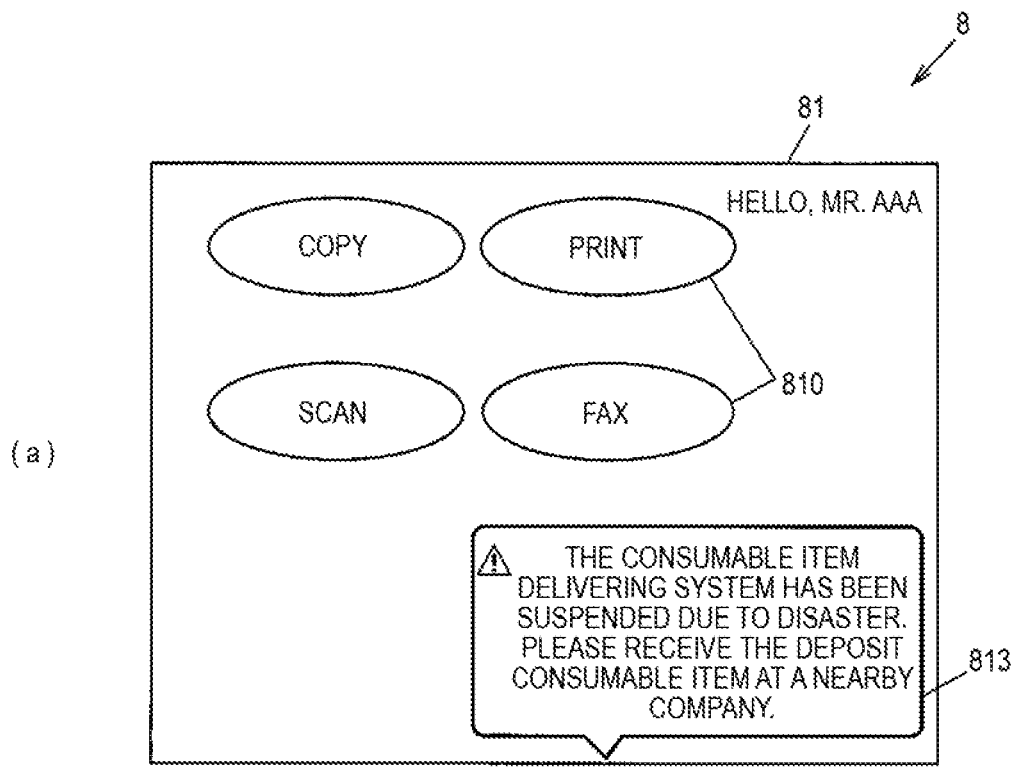
(a)
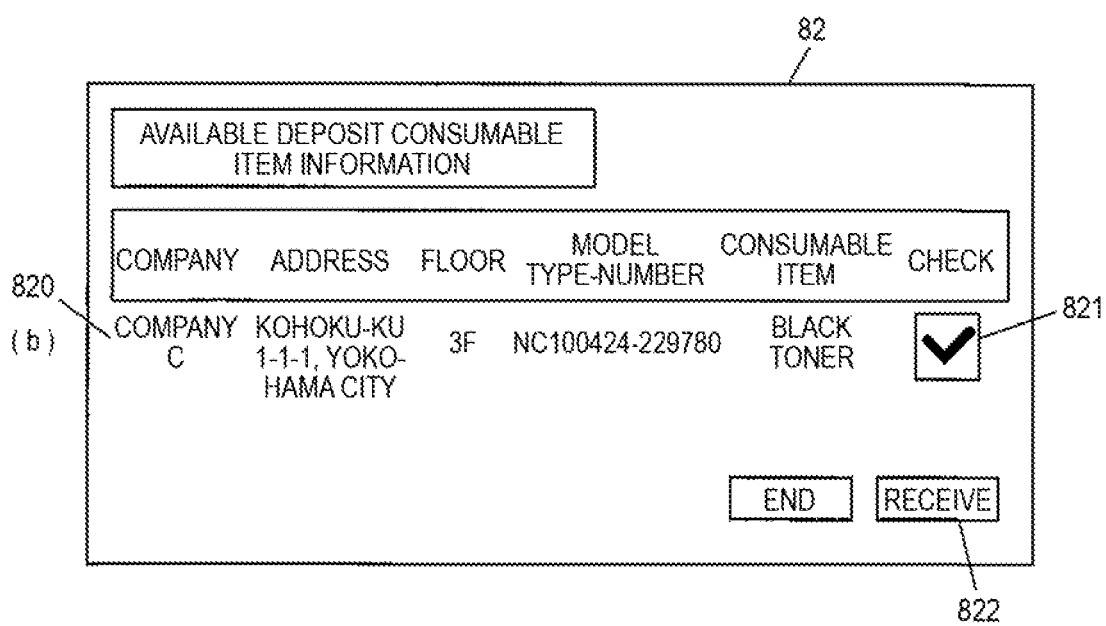
(b)

FIG. 10
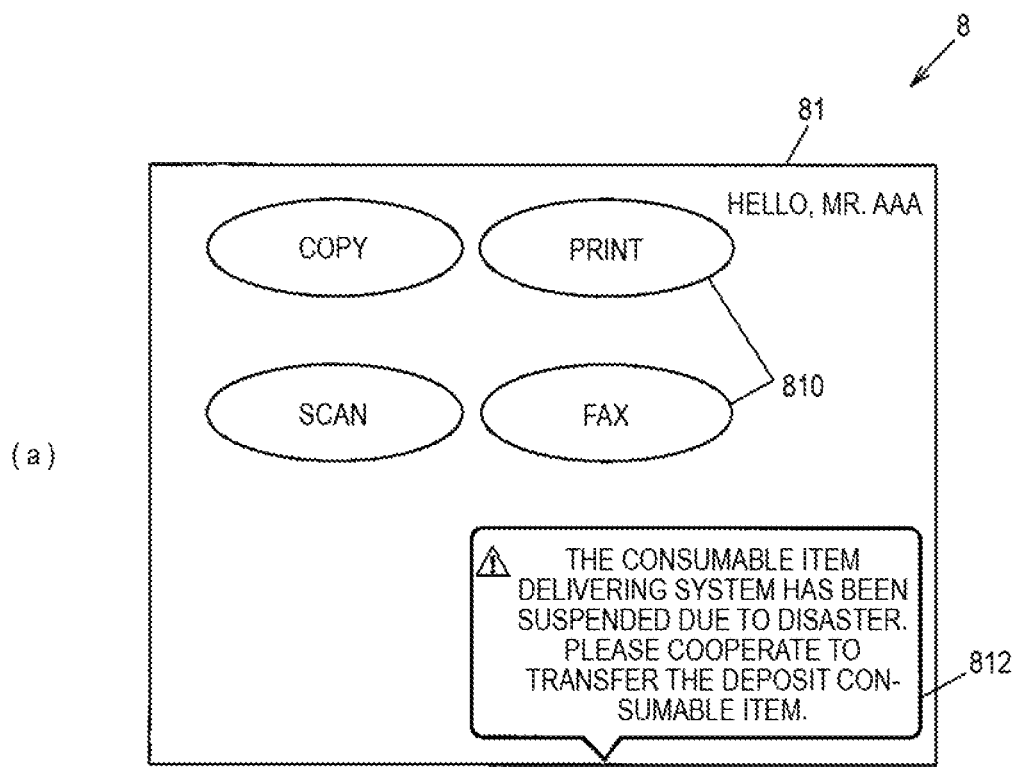
(a)
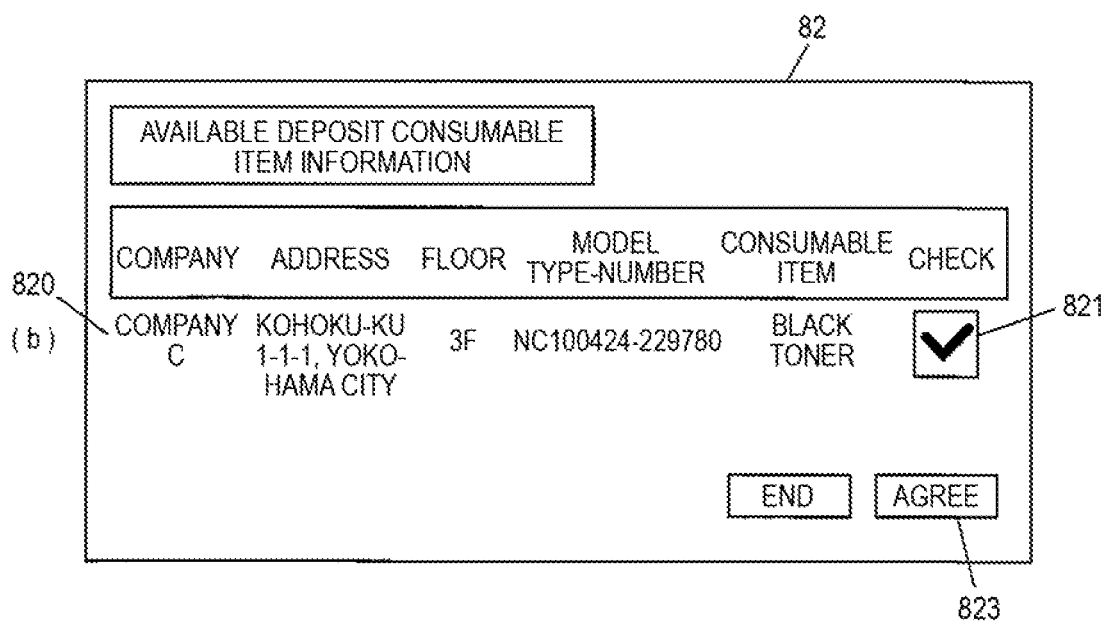
(b)

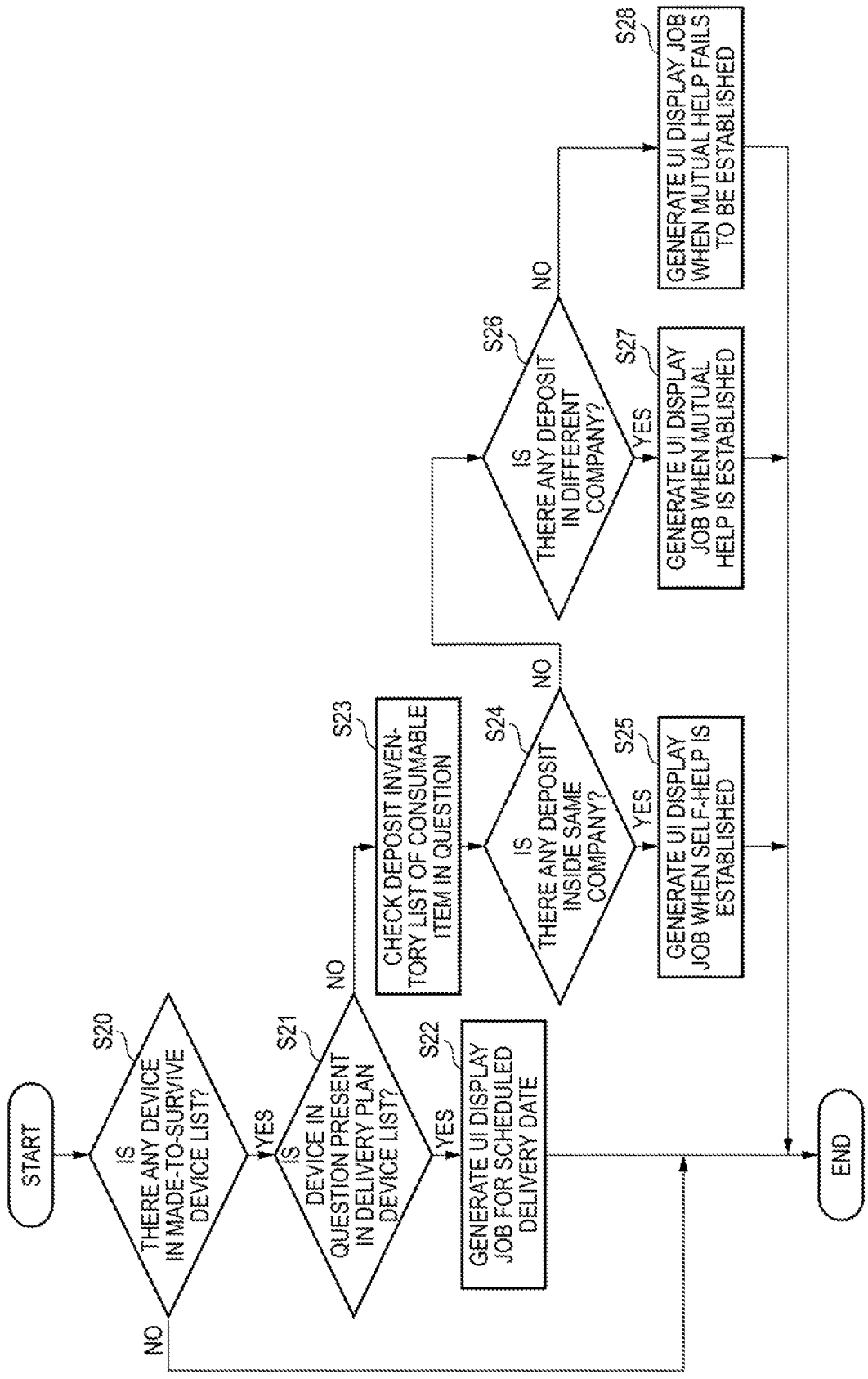

INFORMATION PROCESSING SYSTEM, INFORMATION PROCESSING APPARATUS AND COMPUTER READABLE MEDIUM STORING PROGRAM

CROSS-REFERENCE TO RELATED APPLICATIONS

This application is based on and claims priority under 35 U.S.C. 119 from Japanese Patent Application No. 2019-045942 filed on Mar. 13, 2019.

BACKGROUND

1. Technical Field

The present invention relates to an information processing system, an information processing apparatus and a computer readable medium storing a program.

2. Related Art

Recently, there has been proposed an electronic machine which can simplify a procedure for procuring a consumable item from an inventory held by another electronic machine than the electronic machine (e.g. see JP-A-2017-170796).

The electronic machine described in JP-A-2017-170796 is provided with an inquiry unit and a reservation unit. When the electronic machine has no inventory of a consumable item, the inquiry unit inquires of another electronic machine than the electronic machine about an inventory of the consumable item. The reservation unit reserves the consumable item at the other electronic machine in which the inventory of the consumable item has been confirmed by the inquiry unit.

SUMMARY

Aspects of non-limiting embodiments of the present disclosure relate to provide an information processing system, an information processing apparatus and a computer readable medium storing a program which can supply a specific one of consumable items even when a system for delivering the consumable items for use in machines is suspended.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising: a delivery unit that delivers consumable items to a plurality of machines; a determination unit that determines a specific organization, which can offer a specific consumable item, from a plurality of organizations in accordance with inventory information when the delivery unit is suspended, the inventory information indicating an inventory of the consumable items stored in each of the organizations having a certain scale and serving as a unit managing the plurality of machines; and a display control unit that makes control to display the determined specific organization as a place where the specific consumable item is stored.

BRIEF DESCRIPTION OF DRAWINGS

Exemplary embodiments of the present invention will be described in detail based on the following figures, wherein:

FIG. 4 is a view showing an example of a table of a deposit consumable item list;

FIG. 5 is a view showing an example of a black toner inventory table;

FIG. 6 is a view showing an example of a device list;

FIG. 7 is views showing an example of a UI display screen;

FIG. 8 is views showing an example of the UI display screen;

FIG. 9 is views showing an example of the UI display screen;

FIG. 10 is views showing an example of the UI display screen;

FIG. 15 is a flow chart showing an example of an operation for determining an allocation method of a consumable item according to the modification.

DETAILED DESCRIPTION

An exemplary embodiment of the present invention will be described below with reference to the drawings. Incidentally, constituent elements having substantially the same functions in the respective drawings will be referred to by the same signs correspondingly and respectively, and duplicate description thereof will be omitted. An image forming system will be described as an information processing system below by way of example. The information processing system is however not limited to the image forming system. In addition, an image forming apparatus or a machine managing apparatus will be described as an information processing apparatus. The information processing apparatus is however not limited to the image forming apparatus or the machine managing apparatus.

Exemplary Embodiment

[Configuration of Image Forming System]

Figure 1:
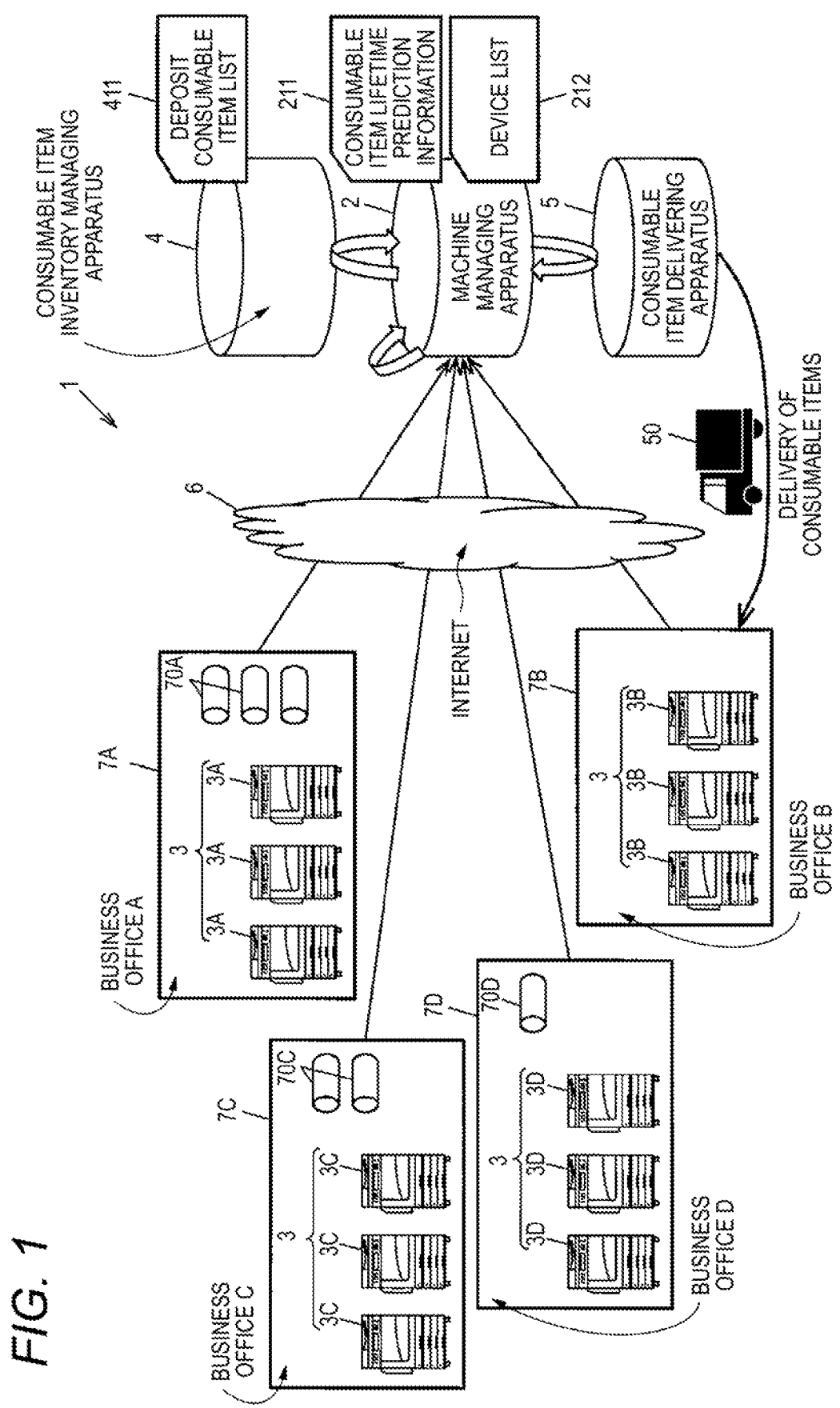
FIG. 1 is a view showing a configuration example of an image forming system according to an exemplary embodiment of the present invention.

FIG. 1 is a view showing a configuration example of an image forming system 1 according to the exemplary embodiment of the present invention. The image forming system 1 has a configuration to include image forming apparatuses 3A to 3D, a machine managing apparatus 2, a consumable item inventory managing apparatus 4, and a consumable item delivering apparatus 5. The image forming apparatuses 3A to 3D are provided in business offices 7A to 7D respectively. The machine managing apparatus 2 is connected to the image forming apparatuses 3A to 3D through a network such as an internet 6 so as to manage the image forming apparatuses 3A to 3D. The consumable item inventory managing apparatus 4 manages an inventory of various consumable items to be used for the image forming apparatuses 3. The consumable item delivering apparatus 5 manages delivery of consumable items to the image forming apparatuses 3. The image forming system 1 is an example of the information processing system.

Here, the "business offices 7A to 7D" are an example of unit organizations for managing the image forming apparatuses 3. The image forming apparatuses 3 are managed respectively by the organizations each of which has a certain scale. Here, the "organizations" are certain-scale units serving as entities managing the image forming apparatuses. 3.

Examples of such an organization include a framework such as an enterprise, a company, a business office, a division (e.g. a department, a group, etc.) belonging to the enterprise, the company or the business office, etc. which may be bundled from the viewpoint of a gathering of people regardless of whether the scale size is large or small, a framework such as a region (e.g. which may be a self-governing body such as a municipality, or a private governing body such as a neighborhood association), a structure (hereinafter also referred to as "building"), a floor or a story (hereinafter also referred to as "floor"), etc. which may be bundled from the viewpoint of a district where each image forming apparatus 3 is installed, and so on. The "floor" is an example of a lower category of the organization to which the image forming apparatus 3 belongs.

Incidentally, when the business offices 7A to 7D are generically named, they may be referred to as "business offices 7" (not shown) simply. In addition, when the image forming apparatuses 3A to 3D have to be distinguished and specified individually for the business offices 7A to 7D respectively, they are stated as "image forming apparatuses 3A", "image forming apparatus 3B" . . . and so on specifically. However, when the image forming apparatuses 3A to 3D are generically named, they may be referred to as "image forming apparatuses 3" simply.

(Machine Managing Apparatus 2)

The machine managing apparatus 2 is a server apparatus which manages the aforementioned image forming apparatuses 3. For example, a personal computer, a tablet terminal, a multifunctional portable phone (smartphone), etc. may be used as the machine managing apparatus 2. The machine managing apparatus 2 is an example of the information processing apparatus.

The machine managing apparatus 2 holds consumable item lifetime prediction information 211, a device list 212, etc. In the consumable item lifetime prediction information 211, lifetimes of consumable items predicted in advance by a predetermined method are recorded for the consumable items correspondingly and respectively. In the device list 212, a list of the image forming apparatuses 3 managed by the machine managing apparatus 2 are recorded. Details of the configuration of the machine managing apparatus 2 will be described later.

(Image Forming Apparatus 3)

For example, the image forming apparatus 3 is a multifunctional machine having a plurality of functions such as a scan function, a printer function, a copy function, a facsimile function and an electronic mail function. Incidentally, the multifunctional machine is an example of the image forming apparatus 3. The image forming apparatus 3 is not limited to the multifunctional machine. The image forming apparatus 3 is an example of the information processing apparatus. When the image forming apparatus 3 is treated as an object to be managed by the machine managing apparatus 2, the image forming apparatus 3 may be simply referred to as "device". The device is an example of the machine. Details of the configuration of the image forming apparatus 3 will be described later.

(Consumable Item Inventory Managing Apparatus 4)

The consumable item inventory managing apparatus 4 manages consumable items for the image forming apparatuses 3 installed at sites of customers. For example, a personal computer, a tablet terminal, a multifunctional portable phone (smartphone), etc. may be used as the consumable item inventory managing apparatus 4.

The consumable item inventory managing apparatus 4 is provided with a unit (not shown) for managing consumable items (which may be hereinafter referred to as "deposit consumable items") 70A, 70C and 70D which are consigned to be kept and stored at the sites of the customers such as the business offices 7, and a unit (not shown) for notifying the machine managing apparatus 2 of information about the deposit consumable items. In addition, the consumable item inventory managing apparatus 4 has a deposit consumable item list 411 indicating deposit statuses of the deposit consumable items 70A, 70B and 70C (see FIG. 4). For example, inventory information is included in the "deposit statuses".

Here, the consumable items mean components which have to be replaced periodically or randomly to be used for the image forming apparatuses 3. For example, respective color toners, toner recovery bottles etc. representatively correspond to the consumable items. Kinds of the consumable items are determined in advance according to model types or numbers of the image forming apparatuses 3. When the deposit consumable items 70A, 70C and 70D have to be distinguished and specified based on the business offices 7 where the deposit consumable items 70A, 70C and 70D are deposited respectively, the same alphabets as the alphabets "A" to "D" suffixed for specifying the business offices 7 are suffixed respectively as "deposit consumable item 70A", "deposit consumable item 70C", "deposit consumable item 70D", etc. When the deposit consumable items 70A, 70C and 70D are generically named, they may be referred to as "deposit consumable items 70" (not shown) simply.

(Consumable Item Delivering Apparatus 5)

The consumable item delivering apparatus 5 is an apparatus managing delivery of consumable items to the image forming apparatuses 3. For example, a personal computer, a tablet terminal, a multifunctional portable phone (smartphone), etc. may be used as the consumable item delivering apparatus 5. The consumable items are designed to be delivered to the respective business offices 7 by a delivery vehicle 50 etc. in accordance with a delivery instruction issued from the consumable item delivering apparatus 5. A consumable item delivering mechanism including the consumable item delivering apparatus 5 and the delivery vehicle 50 may be hereinafter collectively referred to as "consumable item delivering system".

For example, the consumable item delivering apparatus 5 has a unit (not shown) for delivering the consumable items, a unit (not shown) for detecting disaster information, a unit (not shown) for notifying the machine managing apparatus 2 of delivery statuses of the consumable items, etc.

(Internet 6)

In FIG. 1, the internet 6 has been listed as an example of the network. However, for example, a local area network (LAN), a wide area network (WAN), an intranet, etc. may be used as the network alternatively and the network may be wired or wireless.

[Details of Configuration of Machine Managing Apparatus 2]

Figure 2:
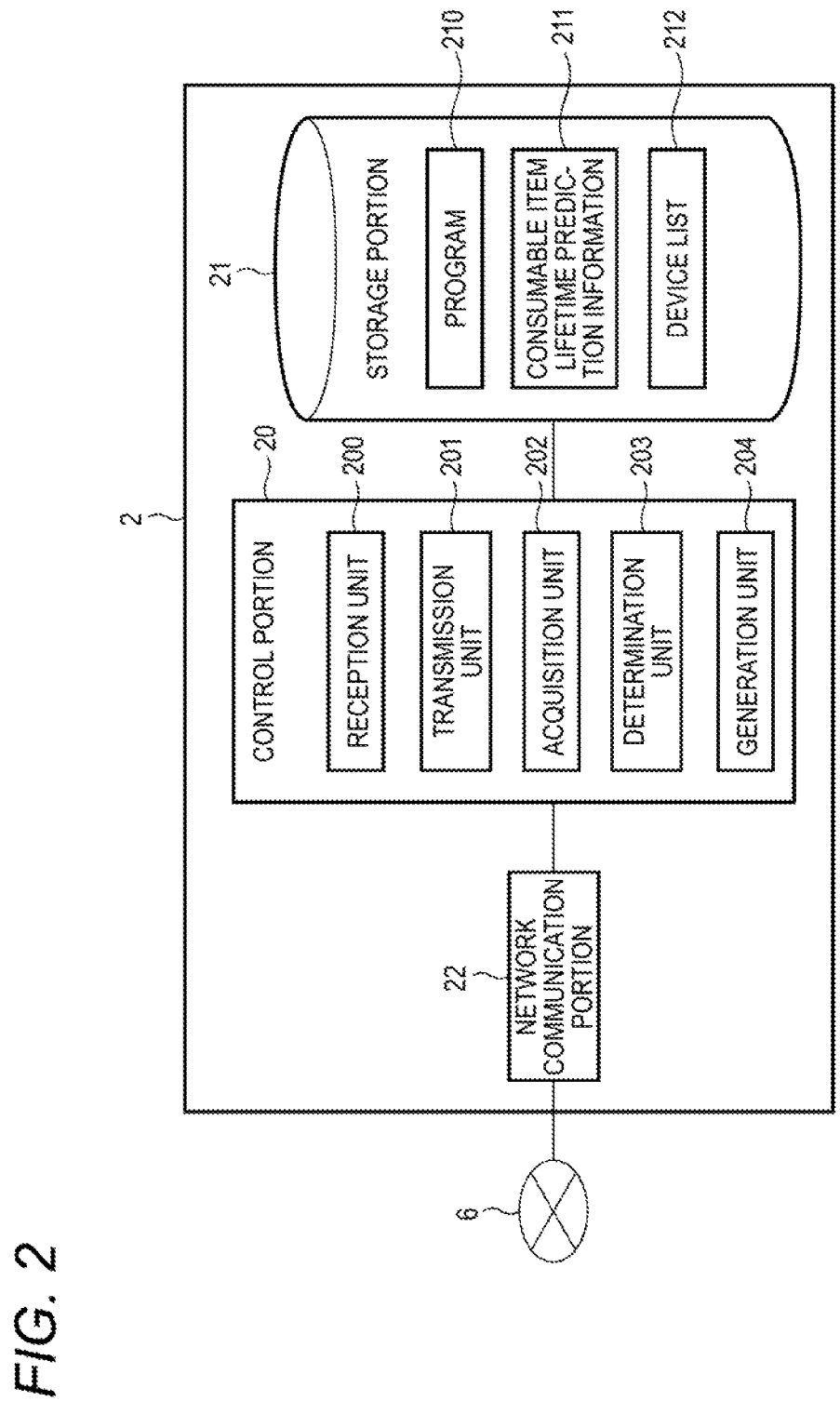
FIG. 2 is a block diagram showing an example of a control system of a machine managing apparatus according to the present exemplary embodiment.

FIG. 2 is a block diagram showing an example of a control system of the machine managing apparatus 2. The machine managing apparatus 2 is provided with a control portion 20, a storage portion 21, and a network communication portion 22. The control portion 20 controls the respective portions. The storage portion 21 stores various data. The network communication portion 22 makes communication with various external apparatuses connected to the machine managing apparatus 2 through the internet 6.

The control portion 20 is constituted by a CPU (Central Processing Unit), an interface, etc. The CPU operates in accordance with a program 210 stored in the storage portion 21 to function as a reception unit 200, a transmission unit 201, an acquisition unit 202, a determination unit 203, a generation unit 204, etc. The determination unit 203 serves as an example of a first determination unit and a second determination unit. Details of the respective units 200 to 204 will be described later.

The storage portion 21 is constituted by an ROM (Read Only Memory), an RAM (Random Access Memory), a hard disk, etc., and stores the various data such as the program 210, the aforementioned consumable item lifetime prediction information 211, the device list 212 (see FIG. 6), etc. Information about the date when each consumable item will reach the end of its lifetime (which may be hereinafter referred to as "predicted lifetime date" simply) and which date is estimated in advance in accordance with a predetermined method is recorded in the consumable item lifetime prediction information 211. Here, the "lifetime" means a state in which the consumable item has to be replaced. For example, the "lifetime" corresponds to a case where a residual quantity of the consumable item has reached a predetermined value or less, a case where the number of times the consumable item has been used has exceeded a certain number, etc. Details of the device list 212 will be described later.

The network communication portion 22 is implemented by an NIC (Network Interface Card) etc. and transmits/receives signals to/from the external apparatuses connected to the machine managing apparatus 2 through the internet 6.

The reception unit 200 receives various information transmitted from relevant apparatuses (specifically, the image forming apparatuses 3, the consumable item inventory managing apparatus 4, and the consumable item delivering apparatus 5, which may be hereinafter generally referred to as units "relevant apparatuses"). For example, the reception unit 200 receives information indicating a matter (which may be hereinafter referred to as "event") which has been carried out by one of the image forming apparatuses 3 (which information may be hereinafter referred to as "event information" simply), etc., from the image forming apparatus 3, and receives information indicating an operating state of the consumable item delivering system, etc., from the consumable item delivering apparatus 5. Incidentally, for example, information about the number of printed sheets, a residual toner quantity, a status of the image forming apparatus 3, etc. is included in the "event".

The transmission unit 201 transmits various information such as a job (which will be described later) for a display instruction of a UI display screen 8 (see FIG. 7 etc.) to the image forming apparatus 3. The acquisition unit 202 acquires information such as the consumable item lifetime prediction information 211, the device list 212, the deposit consumable item list 411, etc. from the machine managing apparatus 2 or the relevant apparatuses.

The determination unit 203 determines priorities based on which an image forming apparatus 3 to be offered with a consumable item is selected from the image forming apparatuses 3, or an allocation method of the consumable item. Details of the determination of the priorities or the allocation method will be described later (see FIG. 12 and FIG. 13).

The generation unit 204 generates a display instruction (which may be hereinafter referred to as "job" simply) for instructing the image forming apparatus 3 to display a screen about screen information 312 on a displace surface (not shown) of an operation display portion 32 of the image forming apparatus 3. The screen information 312 will be described later.

In addition, although not shown, the CPU further functions as an event processing unit which processes the received event and notifies the relevant apparatuses of the processed event.

[Details of Configuration of Image Forming Apparatus 3]

Figure 3:
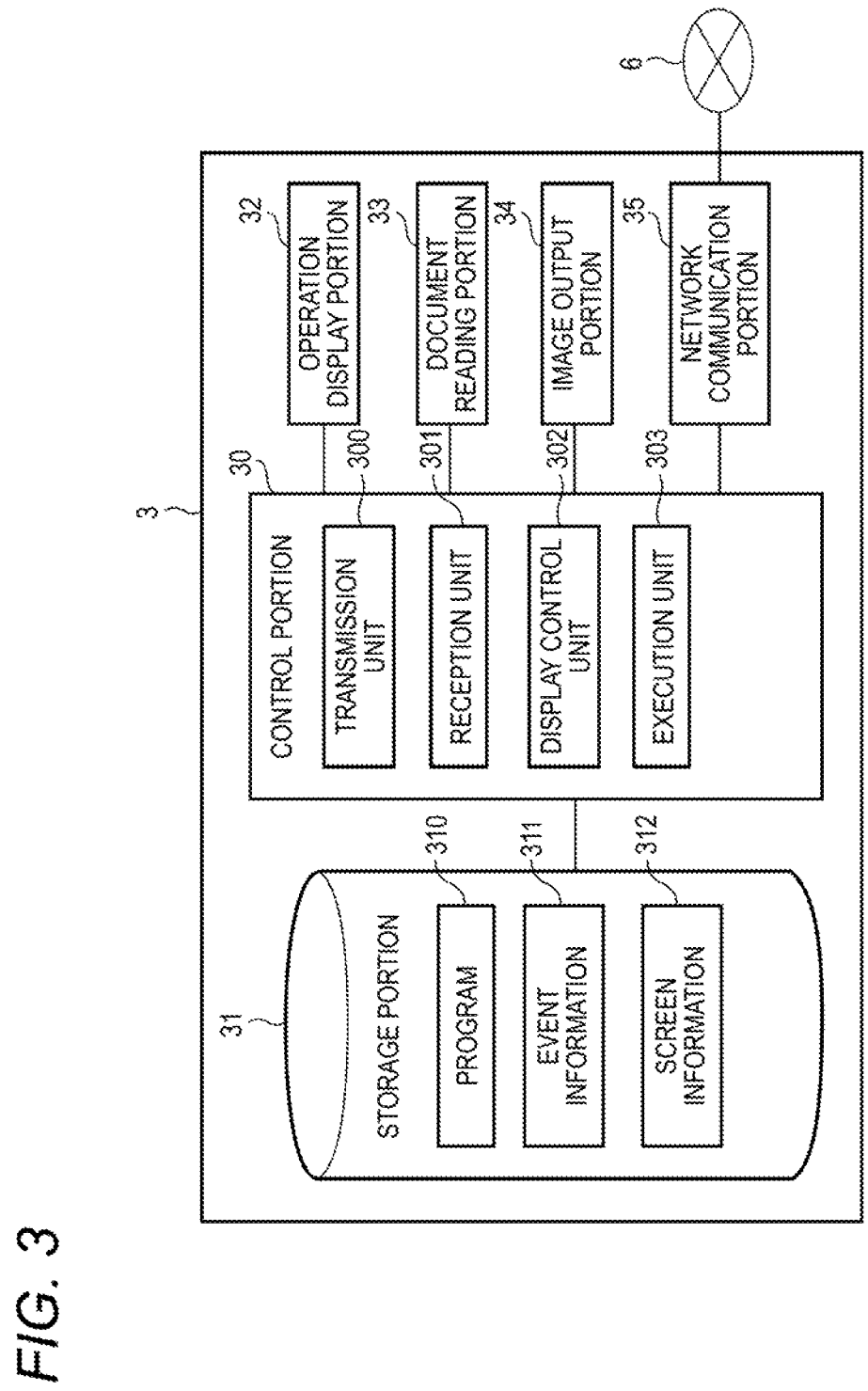
FIG. 3 is a block diagram showing an example of a control system of an image forming apparatus according to the present exemplary embodiment.

FIG. 3 is a block diagram showing an example of a control system of the image forming apparatus according to the present exemplary embodiment. The image forming apparatus 3 is provided with a control portion 30, a storage portion 31, the operation display portion 32, an image reading portion 33, an image output portion 34, and a network communication portion 35. The control portion 30 controls the respective portions. The storage portion 31 stores various data. The operation display portion 32 inputs and displays information. The image reading portion 33 reads a document image from a document. The image output portion 34 prints and outputs the image. The network communication portion 35 makes communication through the internet 6.

The control portion 30 is constituted by a CPU, an interface, etc. The CPU operates in accordance with a program 310 stored in the storage portion 31 to thereby function as a transmission unit 300, a reception unit 301, a display control unit 302, an execution unit 303, etc. Details of the respective units 300 to 303 will be described later.

The storage portion 31 is constituted by an ROM, an RAM, a hard disk, etc., and stores the various data such as the program 310, event information 311, the screen information 312, etc. The event information 311 is information about the aforementioned event. The screen information 312 will be described later.

For example, the operation display portion 32 is a touch panel display, and has a configuration in which a touch panel is disposed and superimposed on a display such as a liquid crystal display.

The image reading portion 33 serves for reading a document image from a document. The image reading portion 33 is provided with an automatic document feeding device (not shown) provided on a document plate (not shown), and a scanner (not shown) so that the image reading portion 33 optically reads a document image from a document disposed on the document plate or a document fed by the automatic document feeding device.

The image output portion 34 prints and outputs a color image or a black-and-white image on a recording medium such as a paper sheet, for example, by an electrographic method, an inkjet method, etc.

The network communication portion 35 is implemented by an NIC etc. The network communication portion 35 transmits/receives signals to/from the external apparatuses connected to the image forming apparatus 3 through the internet 6.

The transmission unit 300 transmits various information such as the event information to the machine managing apparatus 2. The reception unit 301 receives various information transmitted from the machine managing apparatus 2. The display control unit 302 makes control to display the screen about the screen information 312 on the display surface of the operation display portion 32 in accordance with the aforementioned job. The execution portion 303 controls the image reading portion 33, the image output portion 34, etc. to execute each processing.

In addition, although not shown, the CPU of the control portion 30 further functions as a polling unit etc. which visits the machine managing apparatus 2 to acquire the job for the display instruction of the aforementioned UI display screen 8.

(Configurations of Tables)

Next, configurations of various tables used by the image forming system 1 will be described. FIG. 4 is a view showing an example of a deposit consumable item list table 411A. The deposit consumable item list table 411A is a table in which information about an inventory of deposit consumable items is recorded. The deposit consumable item list table 411A is, for example, recorded in the consumable item inventory managing apparatus 4, as described above.

As shown in FIG. 4, an inventory of consumable items (e.g. indicated by the numbers of pieces when the consumable items can be managed separately) is recorded for each model type or number (which may be hereinafter referred to as "commodity series" or "commodity") of the image forming apparatuses 3 in the deposit consumable item list table 411A.

Incidentally, "black toner", "cyan toner", "magenta toner", "yellow toner", and "toner recovery bottle" are listed as examples of the consumable items in FIG. 4. In addition, detailed information about each consumable item is recorded in another table associated with the consumable item (see FIG. 5).

FIG. 5 is a view showing an example of a black toner inventory table. The black toner inventory table 411B is a table indicating details of an inventory of the "black toner" which is, of the consumable items shown in FIG. 4, a consumable item (see a broken-line frame of FIG. 4) for use in an image forming apparatus 3 corresponding to a "commodity 3".

Incidentally, only the "black toner" of the "commodity 3" indicated by the broken-line frame of FIG. 4 will be exemplified and described in FIG. 5 for convenience. However, the same thing applies to the other commodities ("commodities 1, 2, 4 and 5") or the other consumable items (the "cyan toner", the "magenta toner", the "yellow toner", and the "toner recovery bottle"). In addition, detailed information about the consumable items does not have to be always recorded in other tables respectively but may be recorded in one table.

As shown in FIG. 5, identification information (which may be hereinafter referred to as "consumable item ID") given individually to each black toner, information for specifying a customer where the black toner is deposited (e.g. a business office code given to each business office, a business office name indicating a name of the business office, an address thereof, etc.), a name of an engineer (CE: Customer Engineer) in charge of maintenance, etc. are recorded in the black toner inventory table 411B. Incidentally, the number of the consumable items (i.e. the number of lines) shown in FIG. 5 is determined according to a corresponding inventory quantity ("8" in this example) of FIG. 4.

FIG. 6 is a view showing an example of the device list 212. The device list 212 is a table in which a list of the image forming apparatuses 3 connected to the machine managing apparatus 2 through the internet 6, i.e. the image forming apparatuses 3 managed by the machine managing apparatus 2 is recorded. The device list 212 is recorded in the machine managing apparatus 2, as described above.

As shown in FIG. 6, for example, identification information (which may be hereinafter referred to as "machine ID") given to each of the image forming apparatuses 3, information about the image forming apparatus 3 such as a commodity series, information about an organization managing the image forming apparatus 3, such as a business office code or a business office name, information indicating a specific place where the image forming apparatus 3 is installed, such as a floor where the image forming apparatus 3 is installed, information about a consumable item which is required to be supplied, information indicating priority based on which an image forming apparatus 3 to be offered with a consumable item is selected from the image forming apparatuses 3, etc. are recorded in the device list 212.

(Screen Information 214)

The screen information 214 is information about various screens displayed on the display surface of the operation display portion 32 by the display control unit 302. The screen information 214 will be described with reference to FIG. 7 to FIG. 11. Description will be made about (1) a screen displayed on a receiving side when self-help is established (which will be described later) (see FIG. 7), (2) a screen displayed on a forwarding side when the self-help is established (see FIG. 8), (3) a screen displayed on a receiving side when mutual help is established (which will be described later) (see FIG. 9), (4) a screen displayed on a forwarding side when the mutual help is established (see FIG. 10), and (5) a screen displayed when the mutual help fails to be established (which will be described later) (see FIG. 11) separately.

(1) Screen Displayed on Receiving Side when Self-Help is Established

FIG. 7 is a view showing an example of the UI display screen, in which (a) is a view showing an example of a menu screen, and (b) is a view showing an example of a deposit consumable item information screen. The UI display screen 8 shown in FIG. 7 is a screen displayed on a display surface of an operation display portion 32 of an image forming apparatus 3 when a state in which a consumable item in question can be offered from a deposit consumable item 70 inside an organization (e.g. inside one and the same business office 7 or inside one and the same company) which manages the image forming apparatus 3 to be offered with the consumable item without relying on any other organization (which state may be hereinafter referred to as "self-help") is established (the time when the state is established may be hereinafter referred to as "when self-help is established") during suspension of the consumable item delivering system. The organization offering the consumable item is an example of a specific organization.

Here, for example, the case "during suspension of the consumable item delivering system" includes a case where the consumable item delivering apparatus 5 has ceased to function properly due to occurrence of disaster etc., a case where physical distribution of consumable items by the delivery vehicle 50 has been suspended due to disruption of a road or traffic etc., etc. In addition, "the state in which the consumable item in question can be offered is established" specifically corresponds to a case where the deposit consumable item 70 which can be offered as the consumable item in question is in stock.

As shown in FIG. 7, the UI display screen 8 includes the menu screen 81 (see (a) of FIG. 7) and the deposit consumable item information screen 82 (see (b) of FIG. 7B) presenting the deposit consumable item 70 which can be offered to the image forming apparatus 3 regardless of whether the deposit consumable item 70 is inside or outside the organization. As shown in (a) of FIG. 7, execution buttons 810 for executing the aforementioned scan function, the aforementioned printer function, the aforementioned copy function, and the aforementioned facsimile function respectively, and a first message 811 for notification about the suspension of the delivery of the consumable item, its reason, and a state about from where the consumable item can be received are displayed on the menu screen 81.

The notification of the first message 811 is made when the aforementioned self-help is established. The first message 811 includes a sentence indicating a state in which the consumable item in question can be received from the aforementioned same organization. For example, assume that the organization is a "company". In this case, for example, a sentence "Please use the deposit consumable item at your company." is included in the first message 811, as shown in (a) of FIG. 7.

Incidentally, the first message 811 may be enclosed by a specific frame for display. In addition, a mark such as an exclamation mark for calling attention to a matter to be attended to may be added in the first message 811 for display.

As shown in (b) of FIG. 7, the deposit consumable item information screen 82 includes a consumable item list 820, a check button 821, a receive button 822, etc. The consumable item list 820 indicates information about the consumable item which can be offered to the image forming apparatus 3. The check button 821 serves for selecting one consumable item when a plurality of consumable items are displayed in the consumable item list 820. The receive button 822 serves for confirming reception of the consumable item.

Information about a model type and a model number of an image forming apparatus 3, a kind of a consumable item, etc. in addition to information about a customer site where the consumable item is deposited (which may be hereinafter referred to as "deposit destination") such as a name, an address, etc. of the deposit designation, and information indicating a specific place of the deposit destination where the consumable item is stored is displayed as information about the consumable item in the consumable item list 820. The number of consumable items displayed in the consumable item list 820 is not limited to one but may be plural.

(2) Screen Displayed on Forwarding Side when Self-Help is Established

FIG. 8 is a view showing an example of the UI display screen 8, in which (a) is a view showing an example of the menu screen, and (b) is a view showing an example of the deposit consumable item information screen 82. The UI display screen 8 shown in FIG. 8 is a screen displayed on a display surface of an operation display portion 32 of another image forming apparatus 3 inside the organization to which the image forming apparatus 3 to be offered with the consumable item belongs when the self-help is established during the suspension of the consumable item delivering system. The other image forming apparatus 3 is an example of a machine belonging to the specific organization. Different points from the UI display screen shown in FIG. 7 will be mainly described below.

As shown in (a) of FIG. 8, a second message 812 not only indicating that the delivery of the consumable item has been suspended and its reason, but also prompting a user using the other image forming apparatus 3, to cooperate to forward the deposit consumable item 70 is displayed on the menu screen 81. The term "forward" includes transfer, grant, lend, etc. The second message 812 is an example of notification information.

(3) Screen Displayed on Receiving Side when Mutual Help is Established

FIG. 9 is a view showing an example of the UI display screen 8, in which (a) is a view showing an example of the menu screen, and (b) is a view showing an example of the deposit consumable item information screen 82. The UI display screen 8 shown in FIG. 9 is a screen displayed on a display surface of an operation display portion 32 of an image forming apparatus 3 when a state in which a consumable item in question can be offered from a deposit consumable item 70 stored in another different organization from an organization to which the image forming apparatus 3 to be offered with the consumable item belongs (which state may be hereinafter referred to as mutual help) is established (the time when the state is established may be hereinafter referred to as "when mutual help is established") during suspension of the consumable item delivering system. Different points from the UI display screen shown in FIG. 7 will be mainly described below.

In other words, the term "mutual help" means that a plurality of organizations exceeding one organization are in a state in which the organizations offer deposit consumable items 70 managed by the respective organizations to one another during the suspension of the consumable item delivering system. For example, assume that the mutual help is established among different companies. Even in this case, when, for example, the different companies are located in one and the same region or in one and the same building, the different companies may offer the consumable items to one another. Information about the range of the aforementioned organizations, i.e. about which ones of the organizations offer the consumable items to one another may be registered in advance, for example, in the device list 212 etc.

As shown in (a) of FIG. 9, a third message 813 not only indicating that the delivery of the consumable item has been suspended and its reason but also prompting a user using the image forming apparatus 3 to receive the consumable item from another organization is displayed in place of the aforementioned first message 811 on the menu screen 81. Assume that the organization is a "company" by way of example. In this case, for example, a sentence "Please receive the deposit consumable item from a nearby company." is included in the third message 813, as shown in (a) of FIG. 9.

Incidentally, in a case where the self-help is also established when the mutual help is established, the UI display screen 81 when the self-help is established as shown in FIG. 7 may be displayed with priority over the UI display screen 8 when the mutual help is established as shown in FIG. 9.

(4) Screen Displayed on Forwarding Side when Mutual Help is Established

FIG. 10 is a view showing an example of the UI display screen 8, in which (a) is a view showing an example of the menu screen, and (b) is a view showing an example of the deposit consumable item information screen 82. The UI display screen 8 shown in FIG. 10 is a screen displayed on a display surface of an operation display portion 32 of an image forming apparatus 3 belonging to an organization as a provider offering the consumable item (in other words, an organization different from the organization to which the image forming apparatus 3 to be offered with the consumable item belongs) when the mutual help is established during the suspension of the consumable item delivering system.

As shown in (a) of FIG. 10, a second message 812 prompting a user using the other image forming apparatus 3, to cooperate to forward the deposit consumable item 70 is displayed on the menu screen 81. Incidentally, the same words as those in the aforementioned message shown on the menu screen 81 displayed on the forwarding side when the self-help is established, as shown in (a) of FIG. 8, are displayed in the second message 812. However, meaning of the second message 812 shown in (a) of FIG. 10 is different from the meaning of the second message 812 shown in (a) of FIG. 8 at a point that the image forming apparatus 3 to forward the consumable item belongs to the other organization.

(5) Screen Displayed when Mutual Help Fails to be Established

Figure 11:
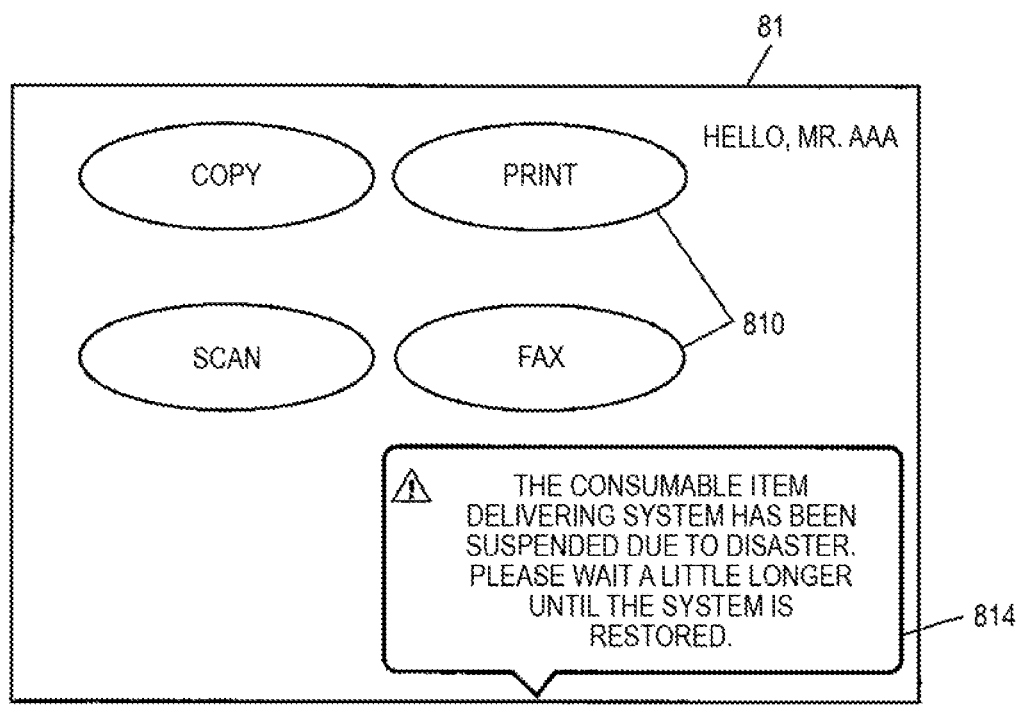
FIG. 11 is a view showing an example of the UI display screen.

FIG. 11 is a view showing an example of the UI display screen 8. When a state in which the consumable item cannot be offered (which state may be hereinafter referred to as "mutual help fails to be established") is generated (the time when the state is generated may be hereinafter referred to as "when mutual help fails to be established"), a fourth message 814 for notifying a user to wait until the suspended consumable item delivering system is resumed (e.g. until the suspended consumable item delivering system is restored when the consumable item delivering system has ceased to function properly due to disaster etc.) is displayed, as shown in FIG. 11.

[Operation of Exemplary Embodiment]

Next, an example of an operation of the image forming system 1 will be described. The operation of the image forming system 1 will be separated into two operations for description. One of the two operations is an operation (1) for determining priorities based on which an image forming apparatus 3 to be offered with a consumable item is selected from image forming apparatuses 3 (which priorities may be hereinafter referred to as the "priorities of the image forming apparatuses 3" simply). The other operation is an operation (2) for determining an allocation method of the consumable item.

(1) Operation for Determining Priorities of Image Forming Apparatuses 3

When there are a plurality of image forming apparatuses 3 each of which has been predicted in advance as it will fall into a state where one of consumable items has to be replaced during suspension of the consumable item delivering system or each of which has already fallen into such a state, the consumable item does not have to be offered to all the image forming apparatuses 3 but may be offered to some of the image forming apparatuses 3 by priority. Details of the operation for determining the priorities of the image forming apparatuses 3 based on which an image forming apparatus 3 to be offered with a consumable item is selected will be described with reference to FIG. 12.

Figure 12:
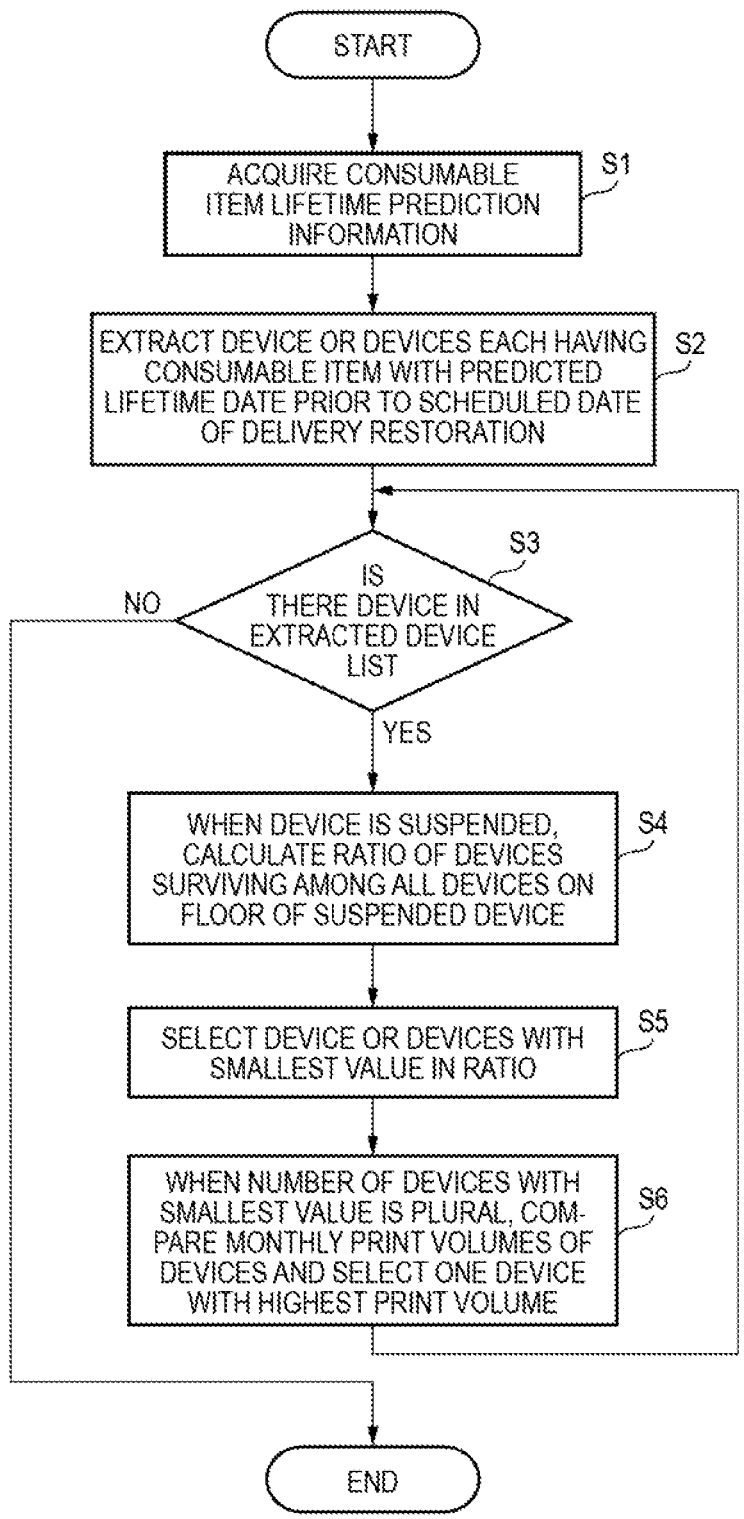
FIG. 12 is a flow chart showing an example of an operation for determining priorities based on which an image forming apparatus to be offered with a consumable item can be selected from image forming apparatuses.

FIG. 12 is a flow chart showing an example of the operation for determining the priorities of the image forming apparatuses 3 based on which an image forming apparatus 3 to be offered with the consumable item is selected. As shown in FIG. 12, first, the acquisition unit 202 acquires consumable item lifetime prediction information 211 (S1).

Next, the determination unit 203 determines the priorities in accordance with a procedure described in the following steps. Specifically, from the consumable item lifetime prediction information 211, the determination unit 203 extracts a device or devices each of which has a consumable item with a predicted lifetime date prior to a scheduled date of estimated delivery resumption ("restoration" will be used below by way of example) (which scheduled date may be hereinafter referred to as "scheduled date of delivery restoration" simply), i.e. a device or devices each of which has a consumable item with a predicted lifetime date prior to the scheduled date of the delivery restoration (S2). When the number of such devices is plural, the determination unit 203 extracts the devices as a device list. The scheduled date of the delivery restoration is an example of a scheduled time for the resumption.

Next, the determination unit 203 executes the following processing on each device in the extracted device list if any (S3: Yes), that is, individually on all the listed devices in the extracted device list if any (S3: Yes).

That is, when the device which is being processed is suspended, the determination unit 203 calculates a ratio of surviving devices (hereinafter also referred to as "survival rate") among all devices on a floor of the suspended device (S4).

Incidentally, the term "surviving" means that none of consumable items in the device will reach the end of the lifetime for replacement prior to the scheduled date of the delivery restoration, i.e. the device can work continuously until the scheduled date of the delivery restoration or it is predicted that the device will work continuously until the scheduled date of the delivery restoration. For example, such a device corresponds to a device in which the predicted lifetime date of any consumable item is after the scheduled date of the delivery restoration.

Incidentally, the survival rate may be calculated in accordance with the following expression (1) by way of example.

Survival Rate=Number of Surviving Devices until Scheduled Date of Delivery Restoration÷Total Number of Devices for Each Floor   (1)

Next, the determination unit 203 selects a device or devices with a smallest value in the ratio (i.e. the survival rate) (S5). When there are a plurality of devices with the smallest value, the determination unit 203 compares monthly PVs (Print Volumes) of the devices with one another, and selects a device with a highest monthly PV (S6).

The aforementioned steps S4, S5 and S6 are executed repeatedly as long as there is a device in the extracted device list (S3: Yes). As a result, a device list including the devices added with priorities, as shown in FIG. 6, is generated.

(2) Operation for Determining Allocation Method of Consumable Item

Figure 13:
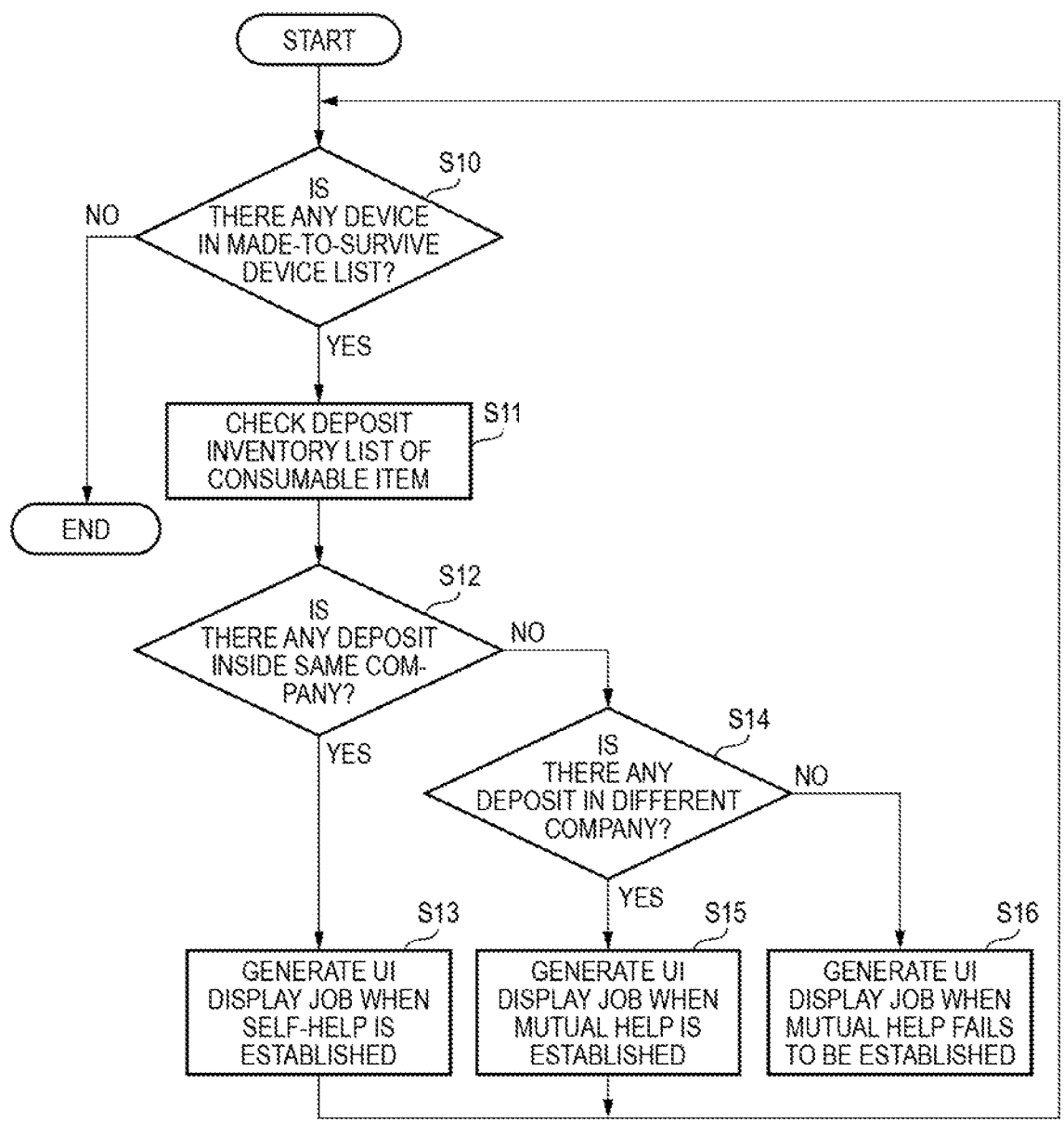
FIG. 13 is a flow chart showing an example of an operation for determining an allocation method of the consumable item.

FIG. 13 is a view showing an example of the operation for determining the allocation method of the consumable item. As shown in FIG. 13, when there is a device in the device list shown in FIG. 6 (which device list may be hereinafter referred to as "made-to-survive device list") (S10: Yes), the determination unit 203 acquires and checks a deposit inventory list of the consumable item, i.e. a deposit consumable item list 411 from the consumable item inventory managing apparatus 4.

Next, the determination unit 203 confirms whether there is a deposit of the consumable item inside the same company or not (S12). When there is a deposit of the consumable item inside the same company (S12: Yes), the determination unit 203 determines that the consumable item will be offered by an allocation method of the consumable item inside the same company.

On this occasion, the generation unit 204 generates a job for a display instruction of a UI display screen 8 when self-help is established (see FIG. 7 and FIG. 8) on a display surface of an operation display portion 32 of a corresponding image forming apparatus 3 (which job may be hereinafter referred to as "UI display job when self-help is established") (S13).

When there is no deposit of the consumable item inside the same company (S12: No), the determination unit 203 confirms whether there is a deposit or not in a different company (S14). When there is a deposit of the consumable item in the different company (S14: Yes), the determination unit 203 determines that the consumable item will be offered by an allocation method of the consumable item from the different company.

On this occasion, the generation unit 204 generates a job for a display instruction of a UI display screen 8 when mutual help is established (see FIG. 9 and FIG. 10) on the display surface of the operation display portion 32 of the corresponding image forming apparatus 3 (which job may be hereinafter referred to as "UI display job when mutual help is established") (S15).

When there is no deposit of the consumable item in the different company (S14: No), the determination unit 203 determines that the corresponding image forming apparatus 3 will wait for restoration of the consumable item delivering system and the consumable item will be offered by a predetermined normal allocation method by the restored consumable item delivering system.

On this occasion, the generation unit 204 generates a job for a display instruction of a UI display screen 8 when mutual help fails to be established (see FIG. 11) on the display surface of the operation display portion 32 of the corresponding image forming apparatus 3 (which job may be hereinafter referred to as "UI display job when mutual help fails to be established") (S16).

Incidentally, although not shown, each of the various jobs generated by the generation unit 204 in the flow chart shown in FIG. 13 is transmitted to the corresponding image forming apparatus 3 through the internet 6 by the transmission unit 201. In the image forming apparatus 3 which is a transmission destination, the reception unit 301 receives the transmitted job, the display control unit 302 makes control to refer to the screen information 312 in accordance with the received job and display a corresponding screen on the display surface of the operation display portion 32.

Modification

Next, a modification of the aforementioned exemplary embodiment of the present invention will be described. In the modification which will be described below, when the suspended consumable item delivering system has been restored, an allocation method is determined in consideration of a list in which a delivery plan of consumable items for respective devices, which list is created by the restored consumable item delivering system, is recorded (which list may be hereinafter referred to as "delivery plan device list"). Details will be described below.

Figure 14:
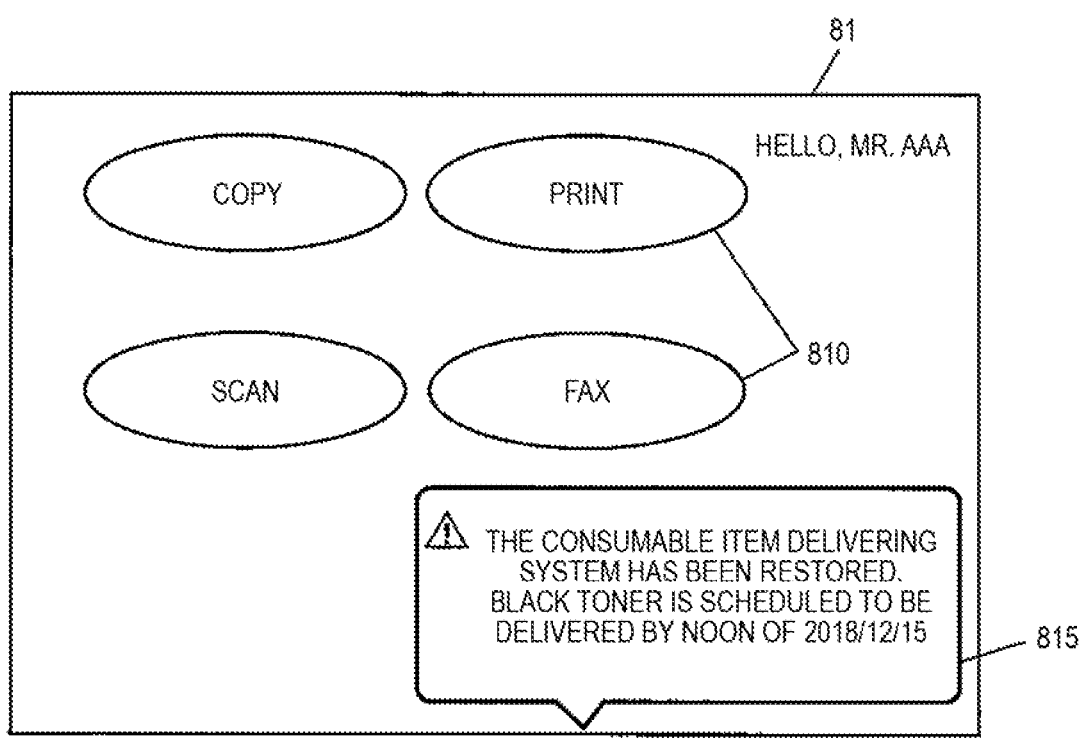
FIG. 14 is a view showing an example of a UI display screen according to a modification.

FIG. 14 is a view showing an example of a menu screen 81 of a UI display screen 8 according to the modification. As shown in FIG. 14, a fifth message 815 is displayed on the menu screen 81 in place of the aforementioned first message 811 to the aforementioned fourth message 814. The fifth message 815 makes notification that the consumable item delivering system has been restored and makes notification that a consumable item in question will be supplied by a predetermined regular method (so-called predetermined normal route) by the restored consumable item delivering system together with a date on which delivery is scheduled (which date may be hereafter referred to as "scheduled delivery date" simply).

An operation for determining an allocation method of the consumable item in consideration of the delivery by the restored consumable item delivering system will be described with reference to FIG. 15. FIG. 15 is a view showing an example of the operation for determining the allocation method of the consumable item according to the modification. Description about the same steps or substantially the same steps as the steps shown in FIG. 13 will be omitted, and different steps from the steps shown in FIG. 13 will be mainly described below.

When a device in question is present in the delivery plan device list generated from the restored consumable item delivering system (S21: Yes), the determination unit 203 determines that the consumable item will be offered by the regular route planned by the consumable item delivering system. The device listed in the delivery plan device list generated from the restored consumable item delivering system is an example of a first machine.

In this case, the generation unit 204 generates a job for a display instruction of the UI display screen 8 (see FIG. 14) including the menu screen 81 displaying the scheduled delivery date on a display surface of an operation display portion 32 of a corresponding image forming apparatus 3 (which job may be hereinafter referred to as "scheduled delivery date UI display job") (S22).

When the device in question is absent from the delivery plan device list (S21: No), the machine managing apparatus 2 operates in a manner similar to or the same as the aforementioned steps S11 to S16 (S23 to S28). The operation is executed repeatedly as long as there is a device in the made-to-survive device list (S20: Yes). Of the devices described in the made-to-survive device list, any device other than the device listed in the delivery plan device list is an example of a second machine.

Incidentally, the aforementioned steps S23 to S28 may be carried out on not only the devices listed in the made-to-survive device list but also all the devices managed by the machine managing apparatus 2. In this case, of the devices managed by the machine managing apparatus 2, any device other than the device listed in the delivery plan device list is an example of the second machine.

Although the exemplary embodiment of the present invention has been described above, the exemplary embodiment of the present invention is not limited to the aforementioned exemplary embodiment, but can be variously modified and performed without changing the gist of the present invention. For example, each of the UI display screens 8 shown in FIG. 7 to FIG. 11 does not always have to be displayed on the display surface of the operation display portion 32 of the image forming apparatus 3. For example, the UI display screens 8 may be displayed on a display surface of a management apparatus (not shown) which is provided for each business office 7 and collectively manages image forming apparatuses 3 inside the business office 7.

Although the consumable items have been described by way of example in the aforementioned exemplary embodiment, limited lifetime components may be used for description. In addition, for example, the units provided in the control portion 20 of the machine managing apparatus 2 may be partially moved to the control portion 30 of the image forming apparatus 3. In addition, the units provided in the control portion 30 of the image forming apparatus 3 may be partially moved to the control portion 20 of the machine managing apparatus 2. Various data stored in the storage portion 21 of the machine managing apparatus 2 may be stored in the storage portion 31 of the image forming apparatus 3. Various data stored in the storage portion 31 of the image forming apparatus 3 may be stored in the storage portion 21 of the machine managing apparatus 2.

Each of the units of the control portion 20, 30 may be constituted by a hardware circuit such as a partially or entirely reconfigurable circuit (FPGA: Field Programmable Gate Array) or an application specific integrated circuit (ASIC).

In addition, the constituent elements of the aforementioned exemplary embodiment can be partially omitted or changed without changing the gist of the present invention. In addition, any step in the flow of the aforementioned exemplary embodiment may be added, deleted, changed, replaced, etc. without changing the gist of the present invention. In addition, the program used in the aforementioned exemplary embodiment can be recorded and provided in a computer-readable recording medium such as a CD-ROM. The program may be stored in advance in an external server such as a cloud server and used through the network.

REFERENCE SIGNS LIST

1 . . . image forming system
2 . . . machine managing apparatus
20 . . . control portion
200 . . . reception unit
201 . . . transmission unit
202 . . . acquisition unit
203 . . . determination unit
204 . . . generation unit
21 . . . storage portion
210 . . . program
211 . . . consumable item lifetime prediction information
212 . . . device list
214 . . . screen information
22 . . . network communication portion
3 . . . image forming apparatus
30 . . . control portion
300 . . . transmission unit
301 . . . reception unit
302 . . . display control unit
303 . . . execution unit
31 . . . storage portion
310 . . . program
311 . . . event information
312 . . . screen information
32 . . . operation display portion
33 . . . image reading portion
34 . . . image output portion
35 . . . network communication portion
4 . . . consumable item inventory managing apparatus
411 . . . deposit consumable item list
411A . . . deposit consumable item list table
411B . . . black toner inventory table
5 . . . consumable item delivering apparatus
50 . . . delivery vehicle
6 . . . internet
7 . . . business office
70, 70A, 70C, 70D . . . deposit consumable item
8 . . . UI display screen
81 . . . menu screen
810 . . . execution button
811 . . . first message
812 . . . second message
813 . . . third message
814 . . . fourth message
815 . . . fifth message
82 . . . deposit consumable item information screen
820 . . . consumable item list
821 . . . check button
822 . . . receive button

The invention claimed is:

1. An information processing system comprising:
a delivery unit that delivers consumable items to a plurality of machines;
a determination unit that determines a specific organization, which is capable of offering a specific consumable item, from a plurality of organizations in accordance with inventory information when the delivery unit is suspended, the inventory information indicating an inventory of the consumable items stored in each of the organizations having a certain scale and serving as a unit managing the plurality of machines; and
a display control unit that makes control to display the determined specific organization as a place where the specific consumable item is stored.

2. The information processing system according to claim 1, wherein:
when the determination unit is used as a first determination unit, the information processing system further comprises a second determination unit that determines priorities based on which a specific machine to be offered with the specific consumable item is selected from the plurality of machines.

3. The information processing system according to claim 2, wherein:
the second determination unit determines the priorities in accordance with a scheduled time of estimated resumption of the delivery unit, and a period in which the consumable item has to be replaced, so that at least one of the specific machine belongs to a lower category of the organization.

4. The information processing system according to claim 3, wherein:
when the suspended delivery unit has been resumed,
the determination unit determines that the consumable item will be offered to a first machine designated by the delivery unit by a method predetermined by the delivery unit, and
the display control unit makes control to display a scheduled delivery date designated by the delivery unit.

5. The information processing system according to claim 4, wherein:
the determination unit determines the specific organization offering the specific consumable item to, of the plurality of machines, a second machine which is different from the first machine.

6. The information processing system according to claim 5, wherein:
the display control unit makes control to display notification information prompting a machine belonging to the specific organization, to cooperate to offer the consumable item.

7. The information processing system according to claim 4, wherein:
the display control unit makes control to display notification information prompting a machine belonging to the specific organization, to cooperate to offer the consumable item.

8. The information processing system according to claim 3, wherein:

the display control unit makes control to display notification information prompting a machine belonging to the specific organization, to cooperate to offer the consumable item.

9. The information processing system according to claim 2, wherein:
when the suspended delivery unit has been resumed,
the determination unit determines that the consumable item will be offered to a first machine designated by the delivery unit by a method predetermined by the delivery unit, and
the display control unit makes control to display a scheduled delivery date designated by the delivery unit.

10. The information processing system according to claim 9, wherein:
the determination unit determines the specific organization offering the specific consumable item to, of the plurality of machines, a second machine which is different from the first machine.

11. The information processing system according to claim 10, wherein:
the display control unit makes control to display notification information prompting a machine belonging to the specific organization, to cooperate to offer the consumable item.

12. The information processing system according to claim 9, wherein:
the display control unit makes control to display notification information prompting a machine belonging to the specific organization, to cooperate to offer the consumable item.

13. The information processing system according to claim 2, wherein:
the display control unit makes control to display notification information prompting a machine belonging to the specific organization, to cooperate to offer the consumable item.

14. The information processing system according to claim 1, wherein:
when the suspended delivery unit has been resumed,
the determination unit determines that the consumable item will be offered to a first machine designated by the delivery unit by a method predetermined by the delivery unit, and
the display control unit makes control to display a scheduled delivery date designated by the delivery unit.

15. The information processing system according to claim 14, wherein:
the determination unit determines the specific organization offering the specific consumable item to, of the plurality of machines, a second machine which is different from the first machine.

16. The information processing system according to claim 15, wherein:
the display control unit makes control to display notification information prompting a machine belonging to the specific organization, to cooperate to offer the consumable item.

17. The information processing system according to claim 14, wherein:
the display control unit makes control to display notification information prompting a machine belonging to the specific organization, to cooperate to offer the consumable item.

18. The information processing system according to claim 1, wherein:
the display control unit makes control to display notification information prompting a machine belonging to the specific organization, to cooperate to offer the consumable item.

19. An information processing apparatus comprising:
a determination unit that determines a specific organization, which is capable of offering a specific consumable item, from a plurality of organizations in accordance with inventory information when a delivery unit delivering consumable items to a plurality of machines is suspended, the inventory information indicating an inventory of the consumable items stored in each of the organizations having a certain scale and serving as a unit managing the plurality of machines; and
a display control unit that makes control to display the determined specific organization as a place where the specific consumable item is stored.

20. A non-transitory computer readable medium storing a program causing a computer to function as:
a delivery unit that delivers consumable items to a plurality of machines;
a determination unit that determines a specific organization, which is capable of offering a specific consumable item, from a plurality of organizations in accordance with inventory information when the delivery unit is suspended, the inventory information indicating an inventory of the consumable items stored in each of the organizations having a certain scale and serving as a unit managing the plurality of machines; and
a display control unit that makes control to display the determined specific organization as a place where the specific consumable item is stored.

* * * * *